(12) United States Patent
Fenny et al.

(10) Patent No.: US 6,247,667 B1
(45) Date of Patent: Jun. 19, 2001

(54) TILTROTOR AIRCRAFT PYLON CONVERSION SYSTEM

(75) Inventors: Carlos Alexander Fenny, Arlington, TX (US); Arthur G. Short, deceased, late of Arlington, TX (US), by Linda Louise Short, executrix

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/369,946

(22) Filed: Aug. 6, 1999

(51) Int. Cl.⁷ ................................................. B64C 27/28
(52) U.S. Cl. ............................................. 244/7 R; 244/56
(58) Field of Search ........................... 244/7 R, 7 A, 244/7 C, 56, 66, 12.4, 75 R; 74/665

(56) References Cited

U.S. PATENT DOCUMENTS

| | | | |
|---|---|---|---|
| 1,846,992 | * 2/1932 | Decker | 244/7 C |
| 1,867,963 | * 7/1932 | Blahnik | 244/7 C |
| 3,360,217 | 12/1967 | Trotter | 244/12 |
| 3,766,790 | * 10/1973 | Weir | 74/665 |
| 4,088,284 | * 5/1978 | Caswell | 244/7 R |
| 5,054,716 | 10/1991 | Wilson | 244/56 |
| 5,092,539 | 3/1992 | Caero | 244/75 R |
| 5,214,972 | * 6/1993 | Larson et al. | 244/75 R |

OTHER PUBLICATIONS

"V–22 Nacelle Conversion Actuator," G. White, Lucal Western Inc., California, USA—Proc Instn Mech Engrs. vol. 207—ImechE 1993.

* cited by examiner

Primary Examiner—Galen L. Barefoot
(74) Attorney, Agent, or Firm—Gardere Wynne Sewell LLP; Sandford E. Warren, Jr.; Kenneth T. Emanuelson

(57) ABSTRACT

A pylon conversion system (100) for operating a pylon (12) on a tiltrotor aircraft (10) between an aircraft mode and a helicopter mode is disclosed. The system (100) comprises first and second pylon conversion actuators (102,104) each having a retracted position and an extended position which corresponding to the aircraft mode and the helicopter mode. A first gearing system (156) is operably coupled to the first pylon conversion actuator (102) and to a first primary power unit (110), a first backup power unit (112) and a first clutch (138). A second gearing system (158) is operably coupled to the second pylon conversion actuator (104) and to a second primary power unit (114), a second backup power unit (116) and a second clutch (142). An interconnect drive train (126) is operably coupled to the first and second clutches (138, 142) such that the first and second pylon conversion actuators (102, 104) are operable between the extended position and the retracted position.

21 Claims, 5 Drawing Sheets

TILTROTOR AIRCRAFT PYLON CONVERSION SYSTEM

TECHNICAL FIELD OF THE INVENTION

This invention relates in general to tiltrotor aircraft and, in particular, to an actuator for moving a pylon on a tiltrotor aircraft between a generally vertical position for take off and landing and a generally horizontal position for level flight.

BACKGROUND OF THE INVENTION

Without limiting the scope of the invention, the background will describe tiltrotor aircraft, as an example.

In aircraft design, many actuators are required to move certain movable elements of the craft relative to other reaction elements. One example of such a use is in the actuation of flaps on a conventional fixed wing aircraft. As in any aircraft environment, the actuator would ideally be extremely reliable, lightweight, compact and require a minimum energy input for actuation, among other requirements.

One commonly used actuator is the ball screw actuator. Generally, a ball screw actuator includes a nut with internal threads and a screw with external threads. A plurality of spherical balls are captured within the threads of the nut and engage the threads on the screw. Rotation of the nut about its center axis while resisting similar rotation of the screw will cause the screw to move axially through the nut. When the nut is mounted on a reaction element and the screw on a moving element in an aircraft, the ball screw operates as an actuator.

One type of aircraft that utilizes a ball screw actuator is the tiltrotor aircraft. Such aircraft include one or more engines that may be operated in a position that is normal for propeller driven aircraft and in a position that is normal for the rotor of a helicopter. As such, the tiltrotor aircraft can take off and land vertically, hover when desired, fly more like an airplane in level flight, and obtain speeds greater than normally possible with helicopters. The term "proprotor" is utilized herein to describe the tiltrotor airscrew since the airscrew provides the attributes of a propeller when in the level flight position and the attributes of a helicopter rotor when in the vertical position.

To achieve dual functionality, the proprotor and its associated power plant, is mounted on a pylon which can pivot on the aircraft between a conventional flight mode and a helicopter mode. In the conventional flight mode, the proprotor rotates in a vertical plane to drive the aircraft forward as in a conventional prop driven aircraft. The pylon and proprotor can then be converted or pivoted to position the proprotor in essentially a horizontal plane, where it can act as a helicopter rotor and the aircraft operated as a helicopter for vertical takeoff and landing. In such an environment, a highly reliable and efficient actuator is necessary for the proper operation of the pylon in converting between the aircraft mode and the helicopter mode.

Therefore, a need has arisen for a highly reliable system for operating the pylon between helicopter mode for take off to aircraft mode for conventional flight and back to helicopter mode for landing. A need has also arisen for such a system that includes redundant mechanical and hydraulic systems that operate in the event of partial system failures.

SUMMARY OF THE INVENTION

The present invention disclosed herein comprises highly reliable pylon conversion system for operating the pylon of a tiltrotor aircraft between helicopter mode for take off and landing to aircraft mode for conventional flight. The pylon conversion system includes redundant mechanical and hydraulic systems that operate in the event of partial system failures.

The pylon conversion system comprises first and second pylon conversion actuators each having a retracted position and an extended position that corresponds to the aircraft mode and the helicopter mode of the tiltrotor aircraft. A first gearing system is operably coupled to the first pylon conversion actuator and to a first primary power unit, a first backup power unit and a first clutch. A second gearing system is operably coupled to the second pylon conversion actuator and to a second primary power unit, a second backup power unit and a second clutch operably coupled to the second gearing system. An interconnect drive train is operably coupled between the first and second clutches such that the first and second pylon conversion actuators are operable between the extended position and the retracted position.

The first and second pylon conversion actuators of the pylon conversion system may be ball screws and are preferably two stage ball screws. The first and second gearing systems may each include a planetary differential and an anti-jam gear. The planetary differentials may be a floating differentials that allow for operation by either the corresponding primary power unit, the corresponding backup power unit or both. A pair of bevel gears may be used to couple the first and second clutches to the interconnect drive train.

The pylon conversion system of the present invention has a plurality of redundant mechanical operation modes. For example, the first and second pylon conversion actuators may be operated between the retracted position and the extended position using the first and second primary power units. Alternatively, the first and second pylon conversion actuators may be operated using the first and second backup power units. As another alternative, the first and second pylon conversion actuators may be operated using the first primary power unit and the second backup power unit. In addition, the first and second pylon conversion actuators may be operated using the first primary power unit, the first backup power unit and the interconnect drive train. In another alternative, the first and second pylon conversion actuators may be operated using only the first primary power unit and the interconnect drive train. Likewise, the first and second pylon conversion actuators may be operated using only the first backup power unit and the interconnect drive train.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
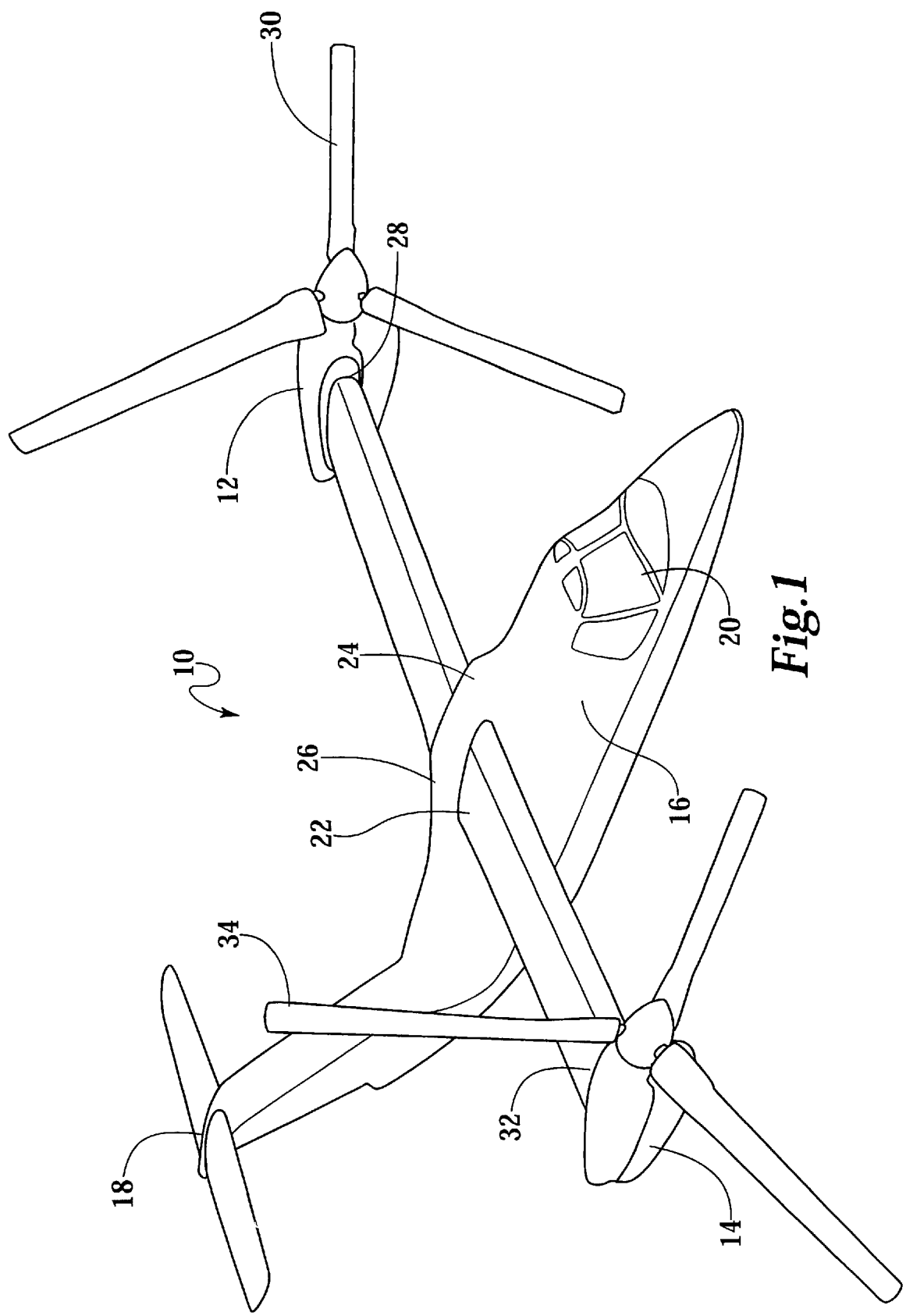
FIG. 1 is a schematic illustration of a tiltrotor aircraft operating a pylon conversion system of the present invention.

Referring to the drawing and to FIG. 1 in particular, shown therein and generally designated by the reference character 10 is a tiltrotor aircraft that includes a pylon conversion system of the present invention. A pylon conversion system is positioned within each of the pylons 12, 14. In addition to the pylon conversion system, the aircraft 10 includes a fuselage 16 which carries at its rear end an empennage assembly 18 and at its forward end a crew cockpit 20.

A wing assembly 22 is connected to and extends transversely across the fuselage 16. Fairings 24 and 26 blend the wing assembly 22 into the fuselage contour. Pivotally mounted on the port wing tip 28 is port pylon 12 that houses an engine having an output shaft that is connected to a reducing gearbox. The gearbox includes a propeller shaft on which is mounted a port proprotor 30.

Similarly, the starboard pylon 14 is located adjacent the starboard wing tip 32. The starboard pylon 14 includes an engine having an engine output shaft that extends into a reducing gearbox. The reducing gearbox includes a propeller shaft which carries a starboard proprotor 34.

Figure 2:
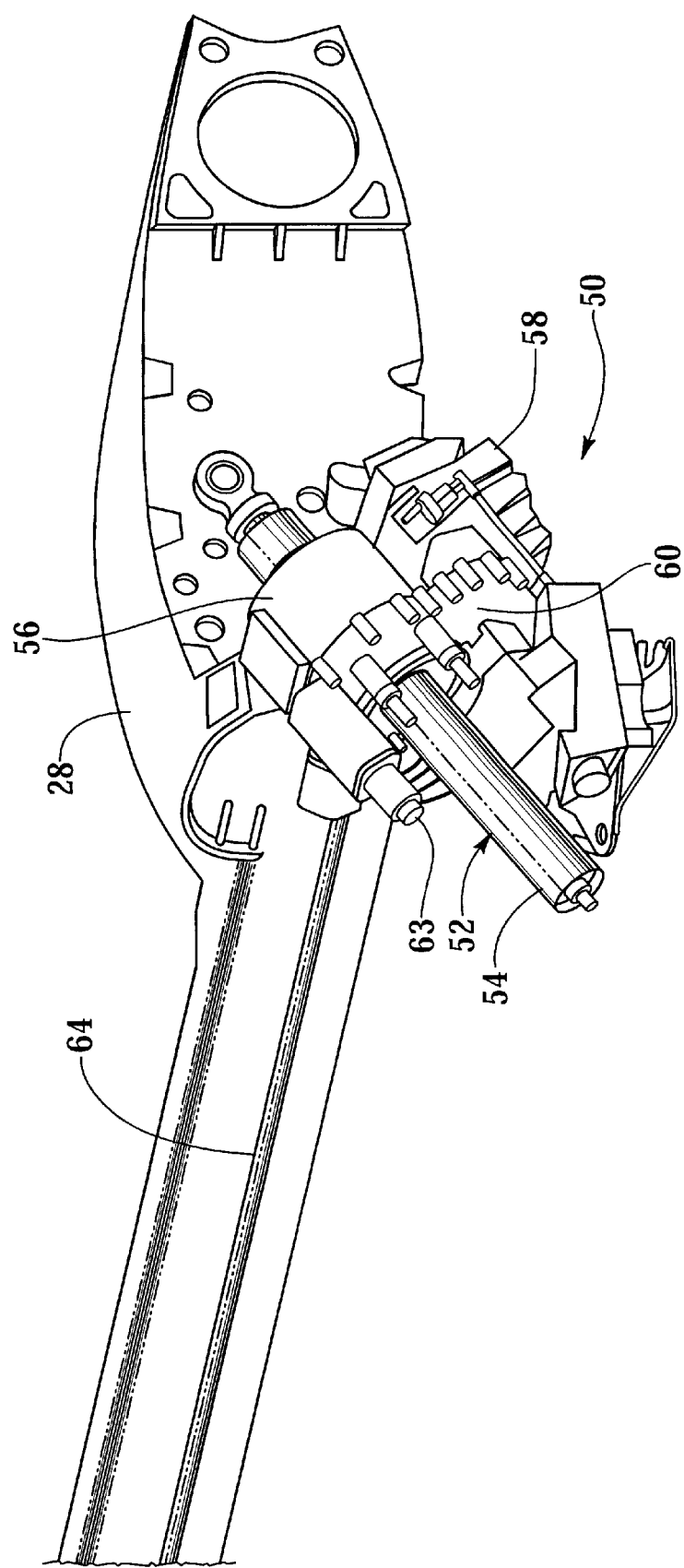
FIG. 2 is isometric view of a pylon conversion pylon conversion system of the present invention in the retracted position.
Figure 3:
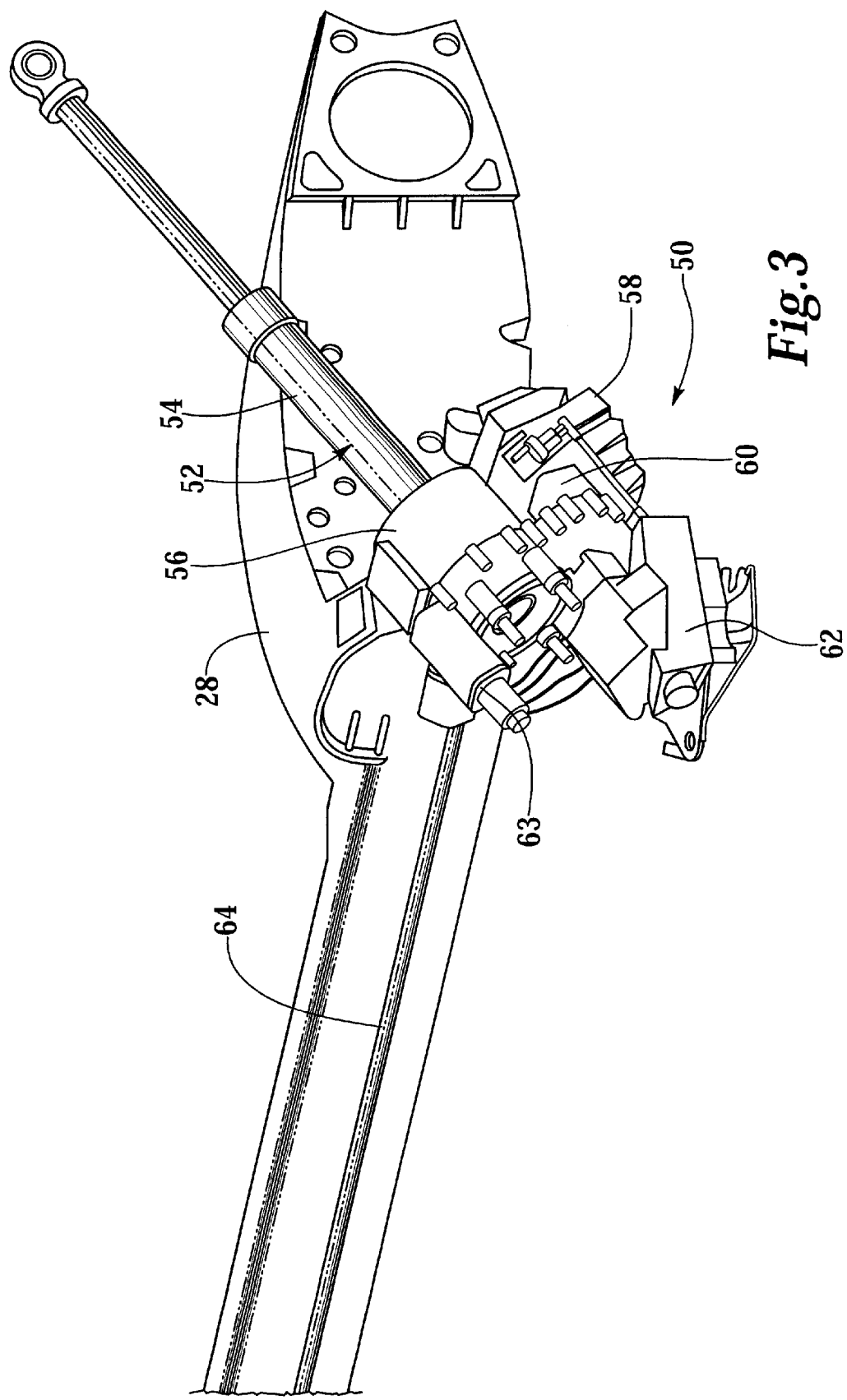
FIG. 3 is isometric view of a pylon conversion pylon conversion system of the present invention in the extended position.

FIGS. 2 and 3 depict a pylon conversion system of the present invention respectively in its retracted position and its extended position and is generally designated 50. The illustrated pylon conversion system 50 is mounted between the port wing tip 28 and the port pylon (not pictured). The pylon conversion system 50 includes a pylon conversion actuator 52 that moves between a retracted position depicted in FIG. 2 and an extended position depicted in FIG. 3, thereby pivoting the attached pylon between the aircraft mode and the helicopter mode, respectively. The pylon conversion actuator 52 is jam resistant and is provided with dual or redundant load pads for enhanced safety. The pylon conversion actuator 52 is a dual ball screw actuator which includes an inner ball screw drive unit 54 and an outer ball screw unit 56, both of which are actuated to move the pylon conversion actuator 52 between the fully retracted and fully extended positions. The use of dual drive units provides a fail safe mode. Specifically, should one of the screw drive units jam, the other drive unit can remain operable for a reduced range of motion of the pylon conversion actuator 52. A more detailed description of the operation of pylon conversion actuator 52 is presented in U.S. Pat. No. 5,092,539 which is assigned to Bell Helicopter Textron Inc. and is hereby incorporated by reference.

Pylon conversion system 50 includes a primary hydraulic power drive unit 58 that is used to drive a planetary differential 60. The pylon conversion system 50 also includes a backup hydraulic power drive unit 62 that may drive the planetary differential 60, in the event of a failure of primary hydraulic power drive unit 58 or a failure of planetary differential 60 as will be explained in further detail below. The backup hydraulic power drive unit 60 not only operates the pylon conversion actuator 52, but also operates a hydraulic clutch mechanism 63. The hydraulic clutch mechanism 63 is coupled to an interconnect drive train 64 that ties the pylon conversion system 50 on the port side to the pylon conversion system on the starboard side.

Figure 4:
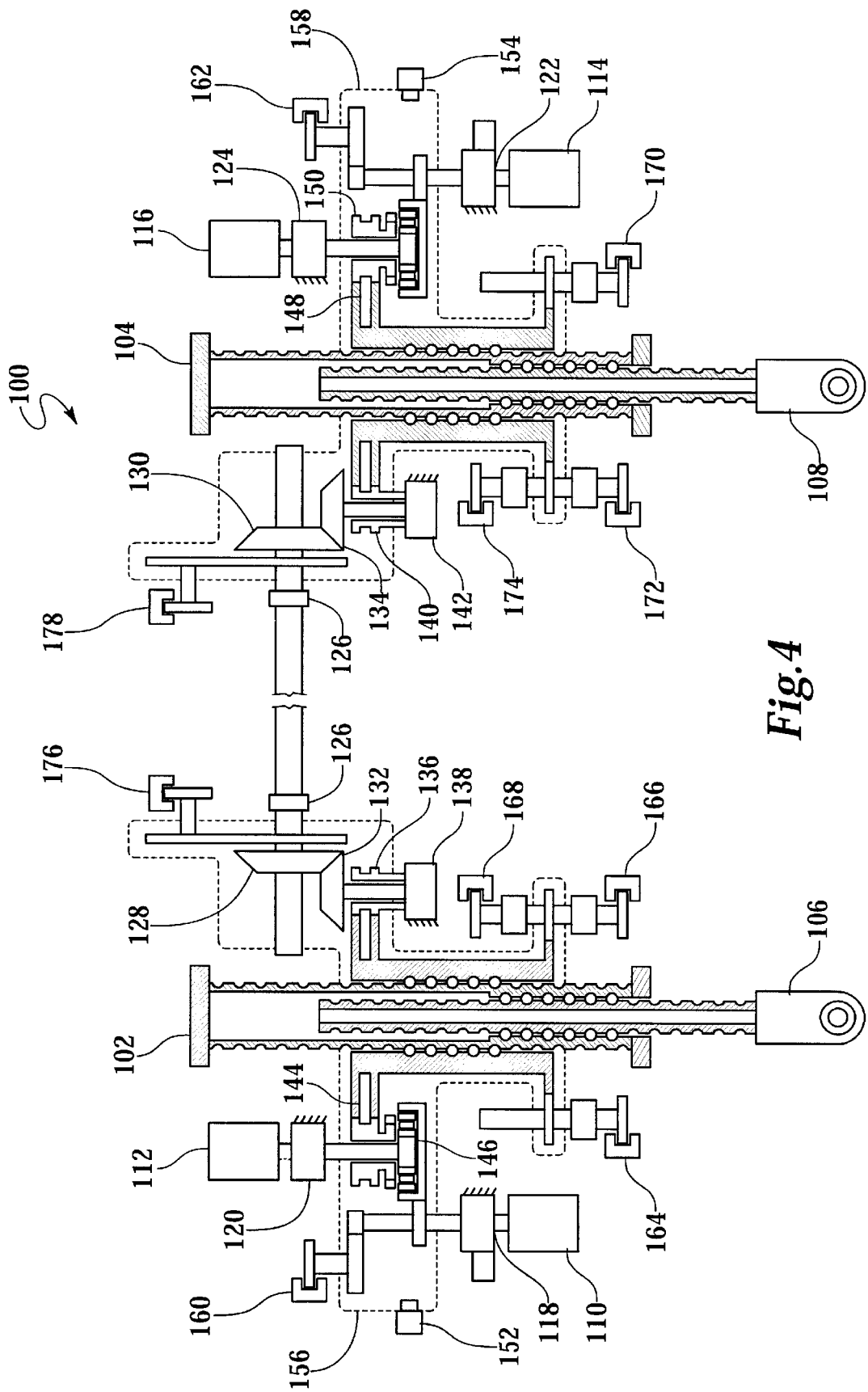
FIG. 4 is a mechanical system schematic of a pylon conversion pylon conversion system of the present invention.

Referring now to FIG. 4, therein is depicted a mechanical schematic of the pylon conversion system of the present invention that is generally designated 100. The pylon conversion system 100 includes a pair of pylon conversion actuators 102, 104 that comprise telescoping balls screws. The pylon conversion actuators 102, 104 have fixed lug ends 106, 108 that are coupled to the pylons on each side of the tiltrotor aircraft.

The pylon conversion system 100 has four hydraulic motors, a primary hydraulic power drive unit 110 and a backup hydraulic power unit 112 for pylon conversion actuator 102 and a primary hydraulic power drive unit 114 and a backup hydraulic power drive unit 116 for pylon conversion actuator 104. Each of the hydraulic power drive units includes a brake. Specifically, the primary hydraulic power drive unit 110 has a primary brake 118, the backup hydraulic power drive unit 112 has a backup brake 120, the primary hydraulic power drive unit 114 has a primary brake 122 and the backup hydraulic power drive unit 116 has a backup brake 124.

Operably coupling the pylon conversion actuator 102 to the pylon conversion actuator 104 is an interconnect drive train 126. At each end of the interconnect drive train 126 are beveled gears 128, 130. The beveled gear 128 engages a beveled gear 132. The beveled gear 130 engages a beveled gear 134. The beveled gear 132 is coupled to a reducing gear 136 which engages a hydraulic clutch 138. Likewise, the beveled gear 134 couples to a reducing gear 140 that engages a hydraulic clutch 142. The reduction gear 136 is coupled to an anti-jam gear 144. The anti-jam gear 144 also couples to a planetary differential 146 that may be driven by either the primary hydraulic power drive unit 110 or the backup hydraulic power unit 112. In a similar manner, the reduction gear 140 is coupled to an anti-jam gear 148. The anti-jam gear 148 is also coupled to a planetary differential 150 that may be driven by the primary hydraulic power drive unit 114 or the backup hydraulic power drive unit 116.

The pylon conversion system 100 includes a variety of sensors. Specifically, chip sensors 152 and 154 respectively detect loose particles within gear boxes 156 and 158. A pair of angular displacement transducers 160, 162 are used to detect proper position of the various gears within gear boxes 156 and 158 respectively. The pylon conversion actuator 102 includes three angular displacement transducers 164, 166, 168 used to determine the position of the pylon associated with the pylon conversion actuator 102. Likewise, the pylon conversion actuator 104 has three angular displacement transducers 170, 172, 174 used to determine the position of the pylon associated with the pylon conversion actuator 104. The angular displacement within the interconnect drive train 126 is detected using angular displacement transducers 176 and 178.

In normal operation, when the tiltrotor aircraft operating the pylon conversion system 100 is to be converted from aircraft mode to helicopter mode, the pylon conversion actuators 102, 104 must be extended. To extend pylon conversion actuators 102, 104, the primary hydraulic power drive units 110 and 114 are operated to rotate the differentials 146 and 150 which, in turn, rotate the anti-jam gears 144, 148 to operate the telescoping ball screws of the pylon conversion actuators 102, 104 and extend the lug ends 106, 108 of the pylon conversion actuators 102, 104. Converting the tiltrotor from aircraft mode to helicopter mode is critical prior to the landing of the tiltrotor aircraft in that the proprotors of the tiltrotor aircraft extend below the landing gear of the tiltrotor aircraft and would contact the ground potentially causing the tiltrotor aircraft to crash. As such, it is important to have built in safety features within the pylon conversion system 100. For example, the pylon conversion actuators 102, 104 each comprise a two stage telescoping ball screw wherein each stage operates independently of the other. Thus, even if one stage of the two stage telescoping ball screw has a failure, the other stage is unaffected and will allow the pylon to rotate a sufficient distance such as the proprotor will not contact the ground when the tiltrotor aircraft is landed.

The pylon conversion system 100 of the present invention also provides mechanical operation redundancy for a failure of the interconnect drive train 126 including failures of associated bearings or failures in the various beveled gears 128, 130, 132,134 by operating the hydraulic clutches 138, 142. More specifically, if such a failure occurs, one or both of the hydraulic clutches 138, 142 may be disengaged such that the operation of the pylon conversion actuators 102, 104 become independent.

The pylon conversion system 100 also has mechanical operation redundancy associated with the primary hydraulic power drive units 110, 114. The pylon conversion system 100 allows the use of the backup hydraulic power drive units 112, 116 in the event of a failure of the corresponding primary hydraulic power drive units 110, 114 or the corresponding primary hydraulic brakes 118, 122 through differentials 146, 150. In addition, in the event of a failure of a differential 146, 150, the corresponding primary hydraulic power drive units 110, 114 and the corresponding backup hydraulic power drive units 112, 116 may be used in tandem to overcome the seized differential 146, 150.

The pylon conversion system 100 may also be operated if both the primary and the backup hydraulic power drive unit that are associated with a single pylon conversion actuator fail. For example, if the primary hydraulic power drive unit 110 and the backup hydraulic power drive 112 fail, pylon conversion actuator 102 may, nonetheless, be operated. When this condition is sensed, both the primary and the backup hydraulic power drive units 114, 116 will operate to drive the differential 150 which, in turn, drives the anti-jam gear 148 which drives the anti-jam gear 144 via the interconnection drive train 126 and the associated beveled gears 128, 130, 132,134 such that the anti-jam gear 144 drives the pylon conversion actuator 102. Even if a failure were then to occur in either the primary hydraulic power drive unit 114 or the backup hydraulic power drive unit 116, a single hydraulic power drive unit could, nonetheless, operate both of the pylon conversion actuators 102, 104 at a reduced rate.

The pylon conversion system 100 utilizes additional mechanical operation redundancy by operating the anti-jam gears 144, 148. In normal operation, the anti-jam gear 144 provides the gearing between the differential 146 and the gear that drives the telescoping ball screw of the pylon conversion actuator 104. Likewise, the anti-jam gear 148 provides the gearing between the differential 150 and the gear that drives the telescoping ball screw of the pylon conversion actuator 104. Anti-jam gears 144, 148 are designed such that they comprise enough flexibility to bend out of the way and not seize when debris or a gear tooth become lodged in the gear mesh. As such, anti-jam gears 144, 148 have enough power to form the gear and roll over the debris.

Figure 5:
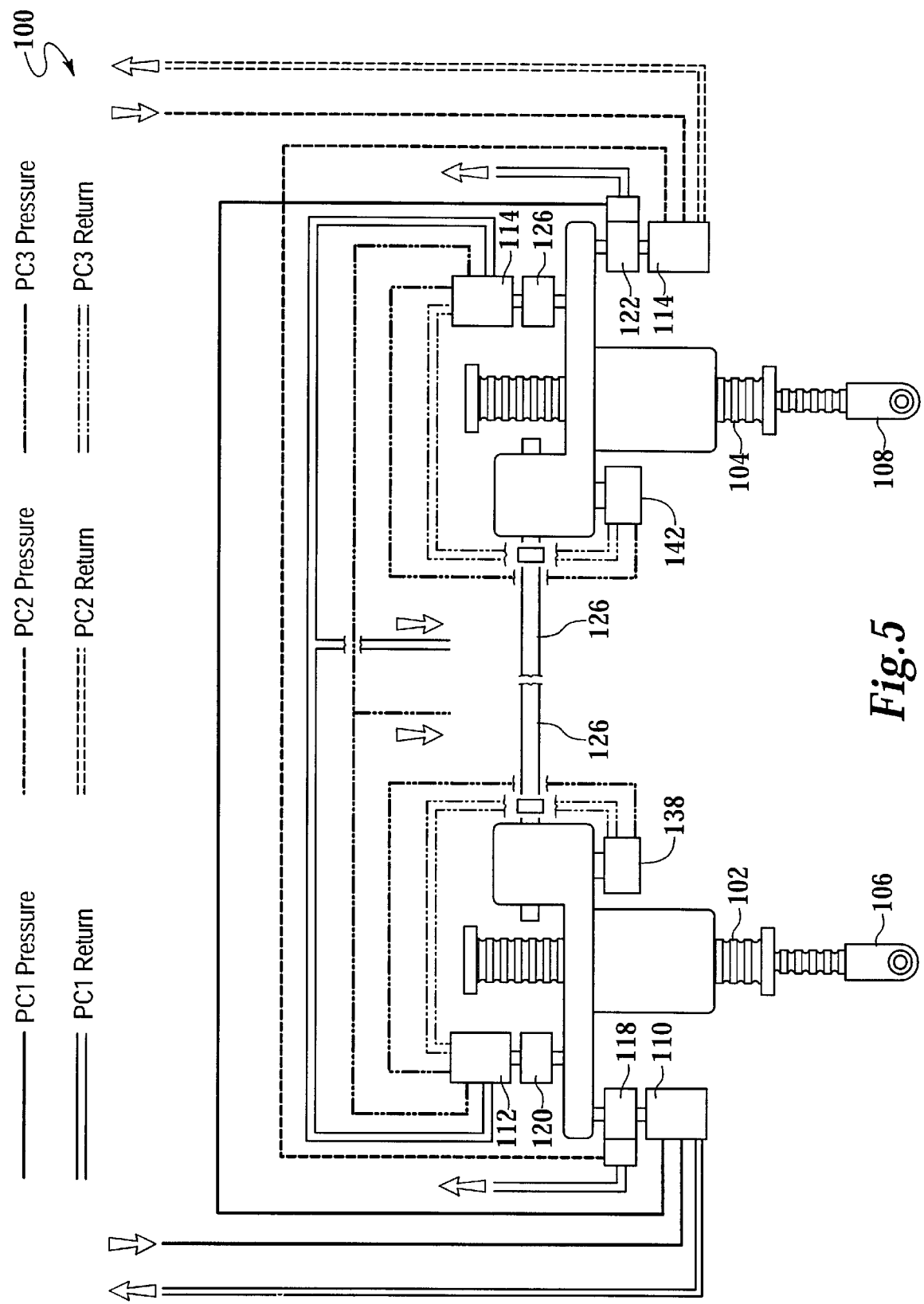
FIG. 5 is a hydraulic system schematic of a pylon conversion pylon conversion system of the present invention.

Referring now to FIG. 5, therein is depicted the hydraulic system used in the pylon conversion system 100 of the present invention. In addition to the mechanical operation redundancy, the pylon conversion system 100 of the present invention has hydraulic operation redundancy. Specifically, the pylon conversion system 100 has three independent hydraulic systems which power the various hydraulic components of the pylon conversion system 100. The first hydraulic system powers the primary hydraulic power drive unit 110 associated with the pylon conversion actuator 102 and is designated in FIG. 5 as PC1 pressure and PC1 return. In addition, the first hydraulic system is used to operate the primary hydraulic brake 122 associated with the primary hydraulic power drive unit 114 of the pylon conversion actuator 104.

The second hydraulic system which is designated as PC2 pressure and PC2 return is used to drive the primary hydraulic power drive unit 114 of the pylon conversion actuator 104 and the primary hydraulic brake 118 associated with the primary hydraulic power drive unit 110 of the pylon conversion actuator 102. A third hydraulic system which is designated as PC3 pressure and PC3 return is used to power both of the backup hydraulic power drive units 112, 116 and both of the hydraulic clutches 138, 142.

Given the mechanical operation redundancy described above with reference to FIG. 4, any two of the three hydraulic systems could fail without a failure in the entire pylon conversion system 100. In normal operating mode, both the first hydraulic system and the second hydraulic system would operate in order to provide power to the primary hydraulic power drive units 110, 114. If, for example, the first hydraulic system failed, this would cause the primary hydraulic power drive unit 110 to cease operation and would engage the primary hydraulic brake 122. Thereafter, the third hydraulic system would commence operation and drive the backup hydraulic power drive units 112, 116 thereby providing full power to the pylon conversion actuators 102, 104. If the third hydraulic system were then to fail causing the backup hydraulic power drive units 112 and 116 to cease operation, then the second hydraulic system would independently operate both pylon conversion actuators 102, 104 using the primary hydraulic drive unit 114 and the mechanical linkage between the pylon conversion actuators 102, 104 including interconnect drive train 126.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A pylon conversion system for operating a pylon on a tiltrotor aircraft between an aircraft mode and a helicopter mode comprising:
   first and second pylon conversion actuators each having a retracted position and an extended position corresponding to the aircraft mode and the helicopter mode;
   a first gearing system operably coupled to the first pylon conversion actuator;
   a first primary power unit, a first backup power unit and a first clutch operably coupled to the first gearing system;
   a second gearing system operably coupled to the second pylon conversion actuator;

a second primary power unit, a second backup power unit and a second clutch operably coupled to the second gearing system; and an interconnect drive train operably coupled to the first and second clutches whereby the first and second pylon conversion actuators are operable between the extended position and the retracted position.

2. The pylon conversion system as recited in claim 1 wherein the first and second pylon conversion actuators further comprise ball screws.

3. The pylon conversion system as recited in claim 1 wherein the first and second pylon conversion actuators further comprise two stage ball screws.

4. The pylon conversion system as recited in claim 1 wherein the extended position of the first and second pylon conversion actuators corresponds to the helicopter mode and the retracted position of the first and second pylon conversion actuators corresponds to the aircraft mode.

5. The pylon conversion system as recited in claim 1 wherein the first and second gearing systems each further comprise a planetary differential.

6. The pylon conversion system as recited in claim 1 wherein the first and second gearing systems each further comprise an anti-jam gear.

7. The pylon conversion system as recited in claim 1 further comprising a pair of bevel gears operably coupling the first and second clutches to the interconnect drive train.

8. The pylon conversion system as recited in claim 1 wherein the first and second pylon conversion actuators are operated between the retracted position and the extended position using the first and second primary power units.

9. The pylon conversion system as recited in claim 1 wherein the first and second pylon conversion actuators are operated between the retracted position and the extended position using the first and second backup power units.

10. The pylon conversion system as recited in claim 1 wherein the first and second pylon conversion actuators are operated between the retracted position and the extended position using the first primary power unit and the second backup power unit.

11. The pylon conversion system as recited in claim 1 wherein the first and second pylon conversion actuators are operated between the retracted position and the extended position using the first primary power unit, the first backup power unit and the interconnect drive train.

12. The pylon conversion system as recited in claim 1 wherein the first and second pylon conversion actuators are operated between the retracted position and the extended position using the first primary power unit and the interconnect drive train.

13. The pylon conversion system as recited in claim 1 wherein the first and second pylon conversion actuators are operated between the retracted position and the extended position using the first backup power unit and the interconnect drive train.

14. A pylon conversion system for operating tiltrotor pylons between an aircraft and a helicopter mode comprising:

first and second pylon conversion actuators each having a retracted position and an extended position corresponding to the aircraft mode and the helicopter mode;

a first gearing system including a first planetary differential gear and a first anti-jam gear operably coupled to the first pylon conversion actuator;

a first primary power unit and a first backup power unit operably coupled to the first planetary differential gear;

a first clutch operably coupled to the first anti-jam gear;

a second gearing system including a second planetary differential gear and a second anti-jam gear operably coupled to the second pylon conversion actuator;

a second primary power unit and a second backup power unit operably coupled to the second planetary differential gear;

a second clutch operably coupled to the second anti-jam gear; and an interconnect drive train operably coupled to the first and second clutches whereby the first and second pylon conversion actuators are operable between the extended position and the retracted position.

15. The pylon conversion system as recited in claim 14 wherein the first and second pylon conversion actuators further comprise two stage ball screws.

16. The pylon conversion system as recited in claim 14 wherein the first and second pylon conversion actuators are operated between the retracted position and the extended position using the first and second primary power units.

17. The pylon conversion system as recited in claim 14 wherein the first and second pylon conversion actuators are operated between the retracted position and the extended position using the first and second backup power units.

18. The pylon conversion system as recited in claim 14 wherein the first and second pylon conversion actuators are operated between the retracted position and the extended position using the first primary power unit and the second backup power unit.

19. The pylon conversion system as recited in claim 14 wherein the first and second pylon conversion actuators are operated between the retracted position and the extended position using the first primary power unit, the first backup power unit and the interconnect drive train.

20. The pylon conversion system as recited in claim 14 wherein the first and second pylon conversion actuators are operated between the retracted position and the extended position using the first primary power unit and the interconnect drive train.

21. The pylon conversion system as recited in claim 14 wherein the first and second pylon conversion actuators are operated between the retracted position and the extended position using the first backup power unit and the interconnect drive train.

* * * * *